Patented Aug. 29, 1933

1,924,861

UNITED STATES PATENT OFFICE 1,924,861

TREATMENT OF LIQUIDS

Wilber Judson, Newgulf, Tex., assignor to The Koppers Company of Delaware, a corporation of Delaware No Drawing. Application March 10, 1931
Serial No. 521,514

11 Claims. (Cl. 210—23)

My invention relates to the treatment of liquids, and especially to the purification of aqueous liquids containing sulphur compounds such as sulphides, polysulphides, hydrosulphides, and the like in solution.

In several industries large amounts of aqueous wastes are produced which contain sulphur in solution in the form of sulphides, polysulphides, and analogous compounds. A relatively small amount of such sulphur compounds is often sufficient to make the disposal of these waste waters difficult and their use for various purposes impossible unless the sulphur is removed. The dissolved sulphides and the like impart to the liquid waste a disagreeable taste and odor, and in many instances make it subject to chemical or bacterial changes, which result in imparting an acid reaction to the water and/or in making it corrosive.

An example of waste water containing dissolved sulphur compounds is the so-called "bleedwater" produced in mining sulphur by the well-known Frasch process, which is practiced on a large scale in this country. In this process, sulphur occurring in underground deposits is melted and forced to the surface with large quantities of heated water. This operation results in the production of enormous quantities of bleed-water which comes to the surface and which consists partly of the water forced into the wells and partly of formation water occurring there.

Formation water frequently contains salts such as sulphates, chlorides, sulphides, bicarbonates and silicates of sodium, calcium, magnesium, etc., amounting to from 4,000 to 5,000 grains per gallon. At the start of a mining operation, the bleed water has approximately the same composition as the formation water. During operation, however, the formation water is diluted by the fresh water supplied to melt the sulphur, and after several years the bleed water may contain less than 400 grains of dissolved solids per gallon. The soluble sulphide content of bleed water eventually reaches a minimum of about 12 to 16 grains per gallon.

The disposal of this bleed water presents a difficult problem. When it is discharged from the bleed wells, and for a long time thereafter, it gives off foul-smelling gases such as hydrogen sulphide, which are injurious to the health and offensive to the senses. Consequently the discharge of this liquid to water courses without previous purification from sulphur is in most communities prohibited by statutes or ordinances.

To make possible the discharge of bleed water and similar effluents to streams and other convenient points of disposal, several processes of removing the dissolved sulphur compounds have been developed. As the amount of sulphur present may be quite small—20 grains or less per gallon, for example—such processes must be very efficient. On the other hand, the quantities of liquid to be treated are enormous, such as several million gallons of bleed water per day from a single mining operation, and a feasible purification process must therefore be very economical in operation or the costs become prohibitive.

Because of these requirements, the most successful processes for purifying such liquids from soluble sulphur compounds such as sulphides effect the purification by aerating the liquids. Aeration alone may be used, but it has been found that better results are obtained by treating the liquid with a catalyst and/or an acid such as $CO_2$, and simultaneously or subsequently aerating. Processes of this type are described in copending applications by J. W. Schwab and C. E. Butterworth in Serial No. 317,685, filed Nov. 6, 1928, and Serial No. 387,800, filed August 22, 1929; by G. A. Bragg and C. J. Smith in Serial No. 393,260, filed Sept. 17, 1929; and by C. J. Smith in Serial No. 394,431, filed Sept. 23, 1929.

In a preferred process, the liquid to be purified, such as bleed water, is first treated with a gas containing carbon dioxide, such as boiler stack gas, or a mixture of such gas with air or other inert gas, and this treatment is followed by aeration or similar treatment with the inert gas alone.

The objectionable sulphur is generally present in the liquid in the form of calcium polysulphide and hydrosulphide and analogous soluble sulphides, which react with the $CO_2$ in the stack gas. The reaction liberates $H_2S$, which is carried out of the system by the current of gas. Calcium carbonate is also formed during the reaction, and when other calcium salts are present in the liquid these may also react with the $CO_2$ to form carbonate.

The carbonation and aeration may be carried out in separate towers, or preferably in a single tower as described in the Smith application referred to hereinabove. In the latter instance the liquid to be purified is delivered to the top of a tower and distributed over contact material, such as wooden hurdles or spiral tile packing contained therein. An inert gas such as air is introduced near the bottom of the tower, and passes upwardly in countercurrent with the flow of liquid. At an intermediate point in the tower stack gas or other gas comprising carbon dioxide is introduced, and passes upwardly through the remainder of the tower with the inert gas.

The carbon dioxide decomposes the calcium polysulphide and analogous compounds in the upper part of the tower, liberating $H_2S$ which passes from the top of the tower with the upward current of gas. The inert gas removes any $H_2S$ and other noxious gases remaining in the liquid in the lower part of the tower, and the liquid withdrawn may be discharged as desired without objectionable contamination of the atmosphere or of water courses into which it flows.

This process is economical and efficient with respect to the purification of the liquid from sulphur compounds, but has the disadvantage that the calcium carbonate formed, being substantially insoluble, precipitates as a hard scale on the wooden hurdles or other tower packing. If it is allowed to accumulate, this precipitate may plug the packing so completely that the tower cannot be used until the deposit is removed.

Cleaning the calcium carbonate from the packing is a tedious and costly job, as it is usually necessary to remove the packing from the tower and scrape off the precipitate by hand. If acids are circulated through the tower to dissolve the deposited material, large amounts are needed, which usually are subsequently wasted, and serious corrosion of the equipment may result. Furthermore the tower is inoperative during the cleaning period, which makes it necessary to provide stand-by equipment of sufficient size to take care of the bleed water.

An object of my present invention is to provide an improved process of purifying aqueous liquids containing sulphur compounds in solution.

Another object of my invention is to provide a method of and a reagent for treating aqueous liquids to prevent the deposition therefrom of calcium carbonate scale on surfaces with which the liquids come in contact.

My invention has for further objects such other operative results and advantages as obtain in the process hereinafter described and claimed.

I have found that depositions of calcium carbonate scale, such as that described hereinabove, can be prevented by adding to bleed water and the like a small quantity of material which supplies phosphate ions to the liquid during its passage through the purifying tower. Suitable materials for this purpose are disodium hydrogen phosphate ($Na_2HPO_4$), sodium dihydrogen phosphate ($NaH_2PO_4$), phosphoric acid ($H_3PO_4$), and other soluble compounds containing the $PO_4$ radical which dissociate to supply phosphate ions to the solution.

I have found that only a very small amount of such materials is necessary to prevent the undesirable scale formation. In the case of sodium dihydrogen phosphate, for example, I found that when 1 grain of $NaH_2PO_4$ was added per gallon of water containing approximately 120 grains of calcium and 20 grains of sulphur (as sulphide), no scale was deposited on the hurdles of a tower in which this water was treated with boiler stack gas during several weeks of continuous operation, and that excellent purification from sulphides was obtained. I also found that equally good results were obtained with much smaller quantities of this phosphate, such as 0.25 grain per gallon of bleed water.

Similarly I have found that in the case of disodium hydrogen phosphate, 1 grain of $Na_2HPO_4.12H_2O$ per gallon of water is satisfactory; in the case of phosphoric acid, 0.25 grain of 75% $H_3PO_4$ solution per gallon, and of calcium dihydrogen phosphate, 0.25 grain of $Ca(H_2PO_4)_2.H_2O$, were sufficient.

The phosphate compound may be added to the sulphur-containing liquid in any desired manner that ensures good mixing before the liquid enters the purifying tower or towers. I have found that a convenient means of effecting this addition is to dissolve the phosphate in water to make a rather dilute solution, which is added to the bleed water or other effluent being treated at a uniform rate.

For example, about 30 lbs. of $NaH_2PO_4$ may be placed in a dissolving box with a screen bottom, and dissolved in 5000 gallons of water, which is run through the dissolving box to a storage tank. The resulting phosphate solution contains 40 to 45 grains of sodium dihydrogen phosphate per gallon, and each gallon is therefore sufficient to prevent precipitation of calcium carbonate scale by from 40 to 200 gallons of treated bleed water.

This solution is withdrawn from the storage tank at a rate corresponding to the rate at which the bleed water is being delivered to the purifying system, and is admitted to the suction side of the bleed water pump or to the passage or trench through which the water flows to the pump. In the pump and/or trench, the phosphate solution is adequately mixed with the bleed water, into which it introduces sufficient phosphate ions to prevent the precipitation of $CaCO_3$ onto the tower packing.

Compounds capable of dissociating to supply phosphate ions may be used in the treatment of aqueous liquids other than bleed water to prevent the deposition of $CaCO_3$ scale on surfaces with which such liquids come in contact. My invention may also be used in connection with processes other than purification from sulphur compounds. For example, phosphate ions may be used to prevent the formation of calcium carbonate scale when a solution containing calcium bicarbonate is heated or treated with an alkali. The preferred phosphate compound and the necessary concentration of phosphate ions in the solution may vary according to the nature of and the impurities in the liquid treated.

That the precipitation of calcium carbonate from aqueous liquids containing it to an extent materially exceeding the amount normally soluble therein is in actual practice prevented by my present invention is illustrated by the examples given hereinabove. The normal solubility of calcium carbonate in water is given in the following table:

| Temperature °C. | Solubility of $CaCO_3$ grains per gallon |
|---|---|
| 0 | 4.73 |
| 10 | 4.08 |
| 20 | 3.79 |
| 25 | 3.27 |
| 30 | 3.04 |
| 40 | 2.57 |
| 50 | 2.22 |

In the example given, the bleed water treated contained 120 grains per gallon of calcium and 20 grains per gallon of sulphur in the form of soluble sulphides. Assuming that all of this sulphur was in the form of calcium hydrosulphide, the liquid contained about 33 grains of $Ca(SH)_2$ per gallon. If only this calcium was converted to carbonate during the treatment with $CO_2$, the carbonation would result in the formation of about 31 grains of $CaCO_3$ per gallon. If, on the other hand, all of the calcium present was converted, the $CaCO_3$ concentration would be about 300 grains per gallon.

In practice, the amount of $CaCO_3$ actually formed varies within these limits—that is, after treatment with $CO_2$ the bleed water usually has a $CaCO_3$ concentration of between 30 and 300 grains per gallon, such as 100 grains per gallon, for example. 300 grains per gallon is approximately 100 times the normal solubility of $CaCO_3$ at the temperatures ordinarily prevailing during treatment. Thus I have found that a very low concentration of phosphate ions is sufficient to prevent deposition of $CaCO_3$ scale by liquids containing up to 100 times the amount of $CaCO_3$ normally soluble therein.

It is known that $H_3PO_4$ is a comparatively weak acid, and dissociates at moderate dilutions to furnish the ions $H_2PO_4'$ and $HPO_4''$. Even at extreme dilutions the acid is only partially resolved into $PO_4'''$. It is probable that the prevailing active phosphate ion in the present process is $HPO_4''$, although one or both of the other ions may also be present to some extent.

The concentrations of reagents used in the examples hereinabove to prevent the deposition of $CaCO_3$ scale, e. g., 0.25 grains per gallon of $NaH_2PO_4$ or of 75% $H_3PO_4$ solution, etc., are equivalent to $HPO_4''$, concentrations of about 0.2 grains per gallon. Concentrations of reagents capable of dissociating to supply 0.15 grains or more of $HPO_4''$ or the other phosphate ions ($H_2PO_4'$ and $PO_4'''$) per gallon of liquid are believed to be satisfactory in all instances. The preferred concentration in any instance may, however, vary as stated hereinabove.

It will be obvious to those skilled in the art that various modifications may be made in the several parts of my process and apparatus without departing from the spirit of my invention, and it is my intention to cover in the claims such modifications as are included in the scope thereof.

I claim as my invention:

1. The process of treating an aqueous liquid containing a soluble calcium compound, which comprises adding to the liquid a compound capable of dissociating to supply phosphate ions to the liquid, contacting the liquid with carbon dioxide to decompose the said calcium compound and from calcium carbonate, and retaining calcium carbonate in the liquid phase at a concentration substantially exceeding its normal solubility.

2. The process of treating an aqueous solution containing a calcium compound, which comprises adding to the solution a compound capable of producing a phosphate ion concentration of at least 0.15 grains per gallon in the solution, converting the calcium compound to calcium carbonate, and thereby producing an aqueous liquid containing calcium carbonate materially in excess of the amount normally soluble therein but which does not deposit calcium carbonate scale on surfaces with which it comes in contact.

3. The process of treating an aqueous liquid containing a dissolved sulphur compound and a dissolved calcium compound, which comprises contacting the liquid with carbon dioxide to liberate sulphur, passing a gas through the liquid to remove liberated sulphur therefrom, and preventing the precipitation of calcium carbonate by adding to the liquid a compound capable of dissociating to furnish phosphate ions.

4. The process of treating an aqueous liquid containing a dissolved sulphur compound and a dissolved calcium compound, which comprises contacting the liquid with carbon dioxide to convert the sulphur to volatile form, passing a gas through the liquid to remove sulphur therefrom, and preventing the deposition of calcium carbonate by adding to the liquid a compound capable of dissociating to furnish phosphate ions.

5. The process of treating an aqeous solution containing a sulphide and a calcium compound, which comprises passing carbon dioxide through the solution in a carbonating stage to convert the sulphide to a volatile sulphur compound and thereby forming calcium carbonate, passing a gas through the solution to remove volatile constituents, and adding to the solution prior to its admission to the carbonating stage a compound capable of furnishing phosphate ions to the solution to prevent deposition of calcium carbonate therefrom.

6. The process of treating an aqueous solution containing a sulphide of calcium, which comprises adding to the solution a soluble compound containing the $PO_4$ radical, contacting the solution with carbon dioxide to liberate sulphur in the form of hydrogen sulphide, and passing an inert gas through the solution to remove hydrogen sulphide.

7. The process of treating an aqueous solution containing sulphur compounds and a dissolved calcium compound, which comprises adding to the solution a compound capable of maintaining therein a phosphate ion concentration of at least 0.15 grains per gallon, passing a gas containing carbon dioxide through the solution to liberate sulphur, and passing an inert gas through the solution.

8. The process of treating an aqueous solution containing sulphur in the form of sulphide and a calcium compound, which comprises adding to the solution a sufficient quantity of a soluble compound containing the $PO_4$ radical to produce in the solution a concentration of not less than about 0.25 grains of the said compound per gallon, contacting the solution with a gas containing $CO_2$ to convert said sulphide to volatile form, thereby forming calcium carbonate, and passing air through the solution to remove volatile sulphur compounds, substantially without precipitation of calcium carbonate.

9. The process of treating sulphur mine bleed water which comprises adding to the water a compound capable of furnishing phosphate ions thereto, contacting the water with a gas containing carbon dioxide, and passing air through the water.

10. The process of treating bleed water which comprises adding to the water a compound which produces a concentration of phosphate ions therein of not less than about 0.15 grains per gallon, contacting the water with gas containing carbon dioxide to convert sulphur compounds contained in the water into more volatile form, and passing a gas through the solution to remove volatile sulphur compounds, substantially without precipitating calcium carbonate.

11. The process of treating sulphur mine bleed water which comprises adding to the water not less than about 0.25 grains of sodium dihydrogen phosphate per gallon of water, passing gas containing carbon dioxide through the water to convert sulphur compounds contained therein to hydrogen sulphide, thereby forming calcium carbonate, and passing air through the water to remove hydrogen sulphide, substantially without deposition of calcium carbonate.

WILBER JUDSON.